(12) United States Patent
Lee et al.

(10) Patent No.: US 8,528,321 B2
(45) Date of Patent: Sep. 10, 2013

(54) EXHAUST PURIFICATION SYSTEM FOR INTERNAL COMBUSTION ENGINE AND DESULFURIZATION METHOD FOR THE SAME

(75) Inventors: Jin Ha Lee, Seoul (KR); Jin Woo Park, Suwon (KR); Hyokyung Lee, Yongin (KR); Sang-Min Lee, Yongin (KR); Jun Sung Park, Yongin (KR)

(73) Assignee: Hyundai Motor Company, Seoul (KR)

( * ) Notice: Subject to any disclaimer, the term of this patent is extended or adjusted under 35 U.S.C. 154(b) by 465 days.

(21) Appl. No.: 12/847,841

(22) Filed: Jul. 30, 2010

(65) Prior Publication Data

US 2011/0126513 A1  Jun. 2, 2011

(30) Foreign Application Priority Data

Dec. 2, 2009  (KR) .................. 10-2009-0118741

(51) Int. Cl.
*F01N 3/00* (2006.01)
*F01N 3/10* (2006.01)
*F01N 3/02* (2006.01)

(52) U.S. Cl.
USPC .................. 60/286; 60/274; 60/295; 60/301; 60/303; 60/311

(58) Field of Classification Search
USPC .................. 60/274, 285, 286, 295, 301, 303, 60/311
See application file for complete search history.

(56) References Cited

U.S. PATENT DOCUMENTS

2004/0172933 A1* 9/2004 Saito et al. .................. 60/277
2008/0016852 A1* 1/2008 Shamis et al. .............. 60/286

\* cited by examiner

*Primary Examiner* — Kenneth Bomberg
*Assistant Examiner* — Audrey K Bradley
(74) *Attorney, Agent, or Firm* — Morgan, Lewis & Bockius LLP (57) ABSTRACT

An exhaust purification system for an internal combustion engine, and a desulfurization method for the same, recovers purification performance of a denitrification catalyst by removing sulfur poisoned at the denitrification catalyst in an exhaust system. The exhaust purification system may include an exhaust pipe through which an exhaust gas flows, the exhaust gas being generated at the internal combustion engine having a first injector injecting a fuel to a combustion chamber, a second injector mounted at the exhaust pipe and additionally injecting the fuel, a particulate filter mounted at the exhaust pipe downstream of the second injector and filtering particulate matters (PM) in the exhaust gas, a denitrification catalyst mounted at the exhaust pipe downstream of the particulate filter and reducing nitrogen oxide contained in the exhaust gas, and a control portion performing desulfurization of the denitrification catalyst when a desulfurization entering condition and a desulfurization condition are satisfied during regenerating the particulate filter.

14 Claims, 4 Drawing Sheets

EXHAUST PURIFICATION SYSTEM FOR INTERNAL COMBUSTION ENGINE AND DESULFURIZATION METHOD FOR THE SAME

CROSS-REFERENCE TO RELATED APPLICATION

This application claims priority to and the benefit of Korean Patent Application No. 10-2009-0118741 filed in the Korean Intellectual Property Office on Dec. 2, 2009, the entire contents of which application is incorporated herein for all purposes by this reference.

BACKGROUND OF THE INVENTION

1. Field of the Invention

The present invention relates to an exhaust purification system for an internal combustion engine and a desulfurization method for the same. More particularly, the present invention relates to an exhaust purification system for an internal combustion engine and a desulfurization method for the same that recovers purification performance of a denitrification catalyst by removing sulfur poisoned at the denitrification catalyst in an exhaust system.

2. Description of the Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matters (PM) contained in the exhaust gas is mounted in the exhaust pipe.

A denitrification catalyst (DE-NOx catalyst) is one type of such a catalytic converter and purifies nitrogen oxide contained in the exhaust gas. If reducing agents such as urea, ammonia, carbon monoxide, and hydrocarbon (HC) are supplied to the exhaust gas, the nitrogen oxide contained in the exhaust gas is reduced in the DE-NOx catalyst through oxidation-reduction reaction with the reducing agents.

Recently, a lean NOx trap (LNT) catalyst is used as such a DE-NOx catalyst. The LNT catalyst absorbs the nitrogen oxide contained in the exhaust gas when the engine operates in a lean atmosphere, and releases the absorbed nitrogen oxide when the engine operates in a rich atmosphere.

However, since a material absorbing the nitrogen oxide in the denitrification catalyst is an alkaline material, the material absorbs oxides of sulfur (material to which sulfur components contained in a fuel or an engine oil are oxidized) as well as the nitrogen oxide contained in the exhaust gas. The sulfur poisoning of the denitrification catalyst deteriorates its purification efficiency. Therefore, desulfurization of the denitrification catalyst is necessary.

According to a conventional desulfurization method for an exhaust purification system, a desulfurization of the denitrification catalyst (denitrification catalyst of nitrogen oxide absorbing type) is performed after the particulate filter is regenerated. That is, the desulfurization of the denitrification catalyst is performed at hot environment caused by heat generated when the particulate filter is regenerated.

According to the conventional desulfurization method for an exhaust purification system, the regeneration of the particulate filter and the desulfurization of the denitrification catalyst cannot be performed simultaneously. The reason is that a large amount of oxygen is necessary in the regeneration of the particulate filter, but the desulfurization of the denitrification catalyst occurs at rich atmosphere lack of oxygen. Therefore, the desulfurization of the denitrification catalyst is performed after the regeneration of the particulate filter is completed. Generally, the particulate filter is regenerated for 10-20 minutes, and the denitrification catalyst is desulfurized for 15-30 minutes. Consequently, the post-injection of fuel into a combustion chamber for the regeneration and the desulfurization for both performed for 25-50 minutes. Therefore, fuel economy may remarkably deteriorate.

In addition, if the fuel is post-injected into the combustion chamber, engines torque changes. To prevent change in the engine torque, fuel economy and driving performance may be deteriorated.

Further, if the fuel is post-injected into the combustion chamber, a large amount of PM and oil dilution may occur.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide an exhaust purification system for an internal combustion engine and a desulfurization method for the same having advantages of shortening a time necessary for a desulfurization and minimizing fuel consumption as a consequence of performing the desulfurization of a denitrification catalyst when a desulfurization entering condition and a desulfurization condition are satisfied during a particulate filter is regenerated.

The present invention has been made in an effort to provide the exhaust purification system for an internal combustion engine and the desulfurization method for the same having further advantages that engine torque may not change and oil dilution may not occur because the desulfurization of the denitrification catalyst is performed by additionally injecting a fuel and the fuel is additionally injected by an injector mounted at an exhaust pipe.

One aspect of the present invention is directed to an exhaust purification system for an internal combustion engine that may include an exhaust pipe through which an exhaust gas flows, the exhaust gas being generated at the internal combustion engine having a first injector injecting a fuel to a combustion chamber, a second injector mounted at the exhaust pipe and additionally injecting the fuel, a particulate filter mounted at the exhaust pipe downstream of the second injector and filtering particulate matters (PM) in the exhaust gas, a denitrification catalyst mounted at the exhaust pipe downstream of the particulate filter and reducing nitrogen oxide contained in the exhaust gas, and a control portion performing desulfurization of the denitrification catalyst when a desulfurization entering condition and a desulfurization condition are satisfied during regenerating the particulate filter.

The regeneration of the particulate filter may begin when a pressure difference between a front end and a rear end of the particulate filter is higher than or equal to a first predetermined pressure.

The regeneration of the particulate filter may be performed by a post-injection of the first injector or an additional injection of the second injector.

The desulfurization entering condition may be satisfied when a predetermined time passes from a regeneration beginning point of the particulate filter, when a PM amount in the particulate filter is smaller than a predetermined PM amount, or when the pressure difference between the front end and the rear end of the particulate filter is lower than a second predetermined pressure.

The desulfurization condition may be satisfied when a poisoning amount of sulfur accumulated in the denitrification catalyst is greater than a predetermined poisoning amount.

The poisoning amount of sulfur accumulated in the denitrification catalyst may be estimated based on at least one of engine operating time, fuel consumption, and engine oil consumption estimated according to engine operating history.

The desulfurization of the denitrification catalyst may be performed by additionally injecting the fuel by the second injector and by repeating lean atmosphere and rich atmosphere of air/fuel ratio.

The desulfurization of the denitrification catalyst may be performed at hot environment caused by heat generated during the regeneration of the particulate filter.

The exhaust purification system may further include a fuel cracking catalyst disposed at the exhaust pipe between the second injector and the denitrification catalyst, wherein the fuel cracking catalyst promotes evaporation of the additionally injected liquid fuel or converts the additionally injected fuel into a high-reactivity reducing agent through thermal decomposition.

The denitrification catalyst may absorb the nitrogen oxide contained in the exhaust gas, release the absorbed nitrogen oxide by the additionally injected fuel, and reduce the nitrogen oxide through oxidation-reduction reaction with the high-reactivity reducing agent.

Another aspect of the present invention is directed to a desulfurization method for an exhaust purification system that may include determining whether a regeneration condition of the particulate filter is satisfied, performing, in a case that the regeneration condition of the particulate filter is satisfied, the regeneration of the particulate filter, determining whether a desulfurization entering condition and a desulfurization condition are satisfied during regenerating the particulate filter; determining whether a desulfurization entering condition and a desulfurization condition are satisfied during regenerating the particulate filter: and performing, in a case that the desulfurization entering condition and the desulfurization condition are satisfied, desulfurization of the denitrification catalyst.

Yet another aspect of the present invention is directed to a desulfurization method for an exhaust purification system that may include determining whether a regeneration condition of the particulate filter is satisfied, performing, in a case that the regeneration condition of the particulate filter is satisfied, the regeneration of the particulate filter, determining whether a desulfurization condition is satisfied during regenerating the particulate filter, determining, in a case that the desulfurization condition is satisfied, whether a desulfurization entering condition is satisfied, and performing, in a case that the desulfurization entering condition is satisfied, desulfurization of the denitrification catalyst.

The regeneration condition of the particulate filter may be satisfied when pressure difference between a front end and a rear end of the particulate filter is higher than or equal to a first predetermined pressure.

According to various embodiments of the present invention, determining whether the desulfurization condition is satisfied may be performed when the desulfurization entering condition is satisfied.

According to other embodiments of the present invention, determining whether the desulfurization entering condition is satisfied may be performed when the desulfurization condition is satisfied.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
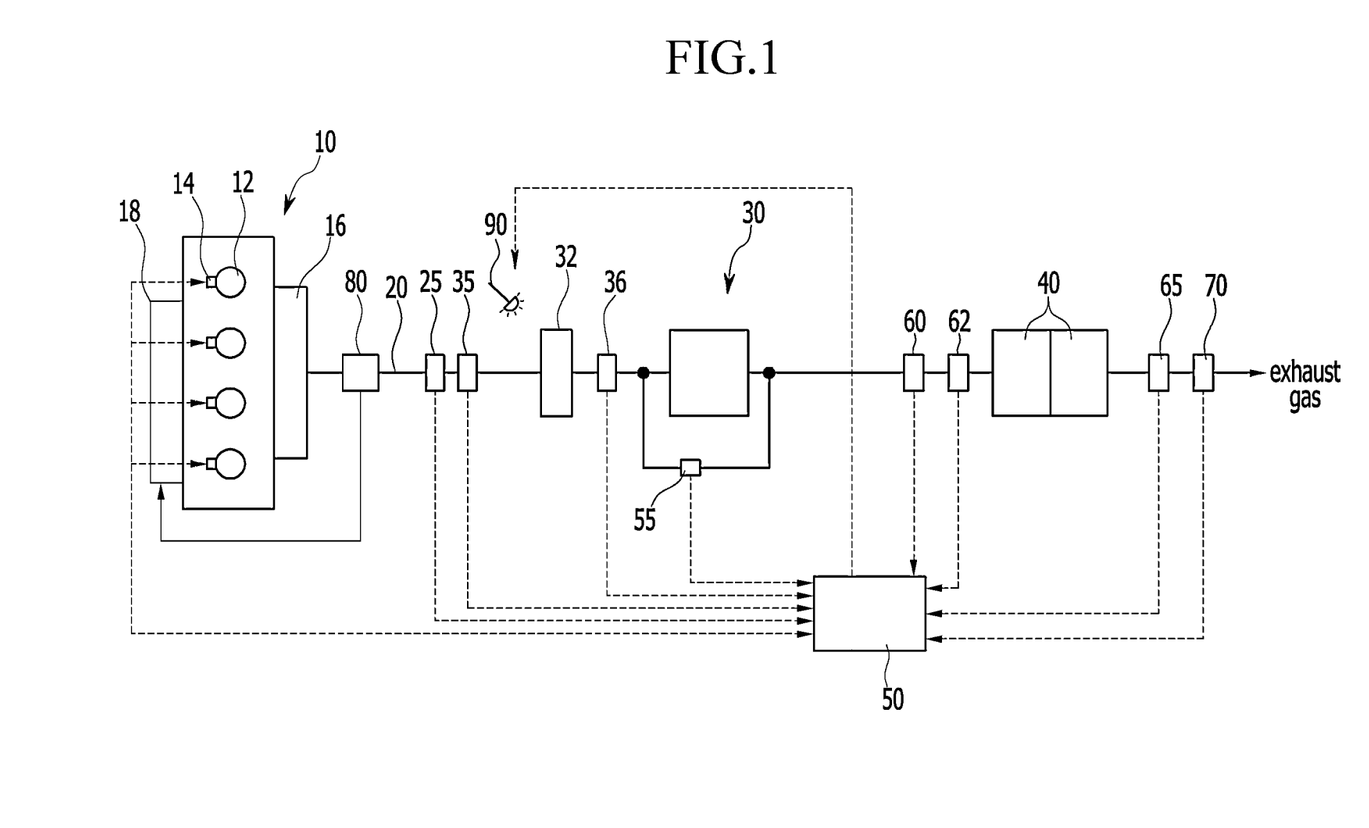
FIG. 1 is a schematic diagram of an exemplary exhaust purification system for an internal combustion engine according to the present invention.

As shown in FIG. 1, an exhaust purification system for an internal combustion engine includes an engine 10, an exhaust pipe 20, an exhaust gas recirculation (EGR) apparatus 80, a fuel cracking catalyst 32, a particulate filter 30, a denitrification catalyst 40, and a control portion or controller 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a lean-burn gasoline engine may be used. In a case that the gasoline engine is used, the air-fuel mixture flows into the combustion chamber 12 through the intake manifold 18, and a spark plug (not shown) is mounted at an upper portion of the combustion chamber 12.

In addition, an engine having various compression ratios, preferably a compression ration lower than or equal to 16.5, may be used.

The exhaust pipe 20 is connected to the exhaust manifold 16 so as to exhaust the exhaust gas to the exterior of a vehicle. The particulate filter 30 and the denitrification (DE-NOx)

catalyst 40 are mounted at the exhaust pipe 20 so as to remove hydrocarbon, carbon monoxide, and nitrogen oxide contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling an amount of the exhaust gas supplied to the intake manifold 18 by control of the control portion 50.

A first oxygen sensor 25 is mounted at the exhaust pipe 20 downstream of the exhaust gas recirculation apparatus 80, and detects oxygen amount in the exhaust gas passing through the exhaust gas recirculation apparatus 80.

The second injector 90 is mounted at the exhaust pipe 20 downstream of the exhaust gas recirculation apparatus 80, is electrically connected to the control portion 50, and performs additional injection of fuel into the exhaust pipe 20 according to control of the control portion 50.

The particulate filter 30 is mounted at the exhaust pipe 20 downstream of the second injector 90. A fuel cracking catalyst is provided at upstream of the particulate filter 30. In this case, the fuel cracking catalyst 32 is disposed between the second injector 90 and the DE-NOx catalyst 40. Herein, the fuel cracking catalyst 32 is provided separately from the particulate filter 30, but the fuel cracking catalyst 32 may be coated at a front portion of the particulate filter 30.

Herein, the fuel cracking catalyst 32 is provided separately from the particulate filter 30, but the diesel fuel cracking catalyst 32 may be coated at a front portion of the particulate filter 30. That is, the fuel cracking catalyst 32 cuts the chain ring constituting hydrocarbon and decomposes the fuel through thermal cracking. Therefore, effective reaction area of the additionally injected fuel increases, and thereby hydrocarbon including high-reactivity oxygen (oxygenated HC), CO, and $H_2$ are produced.

Thermal cracking proceeds as follows.

Here, * means a radical.

Herein, the hydrocarbon represents all compounds consisting of carbon and hydrogen contained in the exhaust gas and the fuel.

A particulate matter filtering device 30 which is one type of the particulate filter 30 is mounted at downstream of the fuel cracking catalyst 32, and traps particulate matters (PM) contained in the exhaust gas exhausted through the exhaust pipe 20. In this specification, the particulate matter filtering device 30 and the particulate filter 30 are used for representing the same filter. However, other types of particulate filter 30 (e.g., catalyst particulate filter (CPF)) may be used instead of using the particulate matter filtering device 30.

In addition, an oxidizing catalyst may be coated at the particulate filter 30. Such an oxidizing catalyst oxidizes hydrocarbon and carbon monoxide contained in the exhaust gas into carbon dioxide, and oxidizes nitrogen monoxide contained in the exhaust gas into nitrogen dioxide. The oxidizing catalyst may be coated mainly at a specific region of the particulate filter 30 or may be coated uniformly at an entire region of the particulate filter 30.

A first temperature sensor 35 is mounted at the exhaust pipe 20 upstream of the fuel cracking catalyst 32, and detects an inlet temperature of the fuel cracking catalyst 32. A second temperature sensor 36 is mounted at downstream of the fuel cracking catalyst 32, and detects an outlet temperature of the fuel cracking catalyst 32 or an inlet temperature of the particulate filter 30.

Meanwhile, a pressure difference sensor 55 is mounted at the exhaust pipe 20. The pressure difference sensor 55 detects a pressure difference between an inlet and an outlet of the particulate filter 30, and transmits a signal corresponding thereto to the control portion 50. The control portion 50 controls the particulate filter 30 to be regenerated when the pressure difference detected by the pressure difference sensor 55 is higher than or equal to a first predetermined pressure. In this case, the first injector 14 can post-inject fuel so as to burn the particulate matters trapped in the particulate filter 30. On the contrary, the second injector 90 can additionally inject the fuel so as to regenerate the particulate filter 30.

The DE-NOx catalyst 40 is mounted at the exhaust pipe 20 downstream of the particulate filter 30. The DE-NOx catalyst 40 stores the nitrogen oxide contained in the exhaust gas, and releases the stored nitrogen oxide by the additional injection of the fuel. In addition, the DE-NOx catalyst 40 performs a reduction reaction of the released nitrogen oxide so as to purify the nitrogen oxide contained in the exhaust gas.

A third temperature sensor 60 and a fourth temperature sensor 65 are mounted respectively at upstream and downstream of the DE-NOx catalyst 40 so as to detect an inlet temperature and an outlet temperature of the DE-NOx catalyst 40. Herein, the DE-NOx catalyst 40 is divided into two parts. Why the DE-NOx catalyst 40 is divided into two parts is that metal ratio coated at each part may be changed so as to perform a specific function. For example, heat-resisting ability of a first part 40 close to the engine 10 is strengthened by increasing palladium (Pd) ratio, and slip of hydrocarbon at a second part 40 is prevented by increasing platinum (Pt) ratio. On the contrary, the DE-NOx catalyst 40 in which the same metal ratio is coated at an entire region thereof may be used.

In addition, a second oxygen sensor 62 is mounted at the exhaust pipe 20 upstream of the denitrification catalyst 40, and a third oxygen sensor 70 is mounted at the exhaust pipe 20 downstream of the denitrification catalyst 40. The second oxygen sensor 62 detects oxygen amount contained in the exhaust gas flowing in the denitrification catalyst 40 and transmits a signal corresponding thereto to the control portion 50 so as to help the control portion 50 perform lean/rich control of the exhaust gas. In addition, the third oxygen sensor 70 is used for monitoring whether the exhaust purification system for an internal combustion engine according to various embodiments of the present invention normally purifies noxious materials contained in the exhaust gas. Herein, it is exemplary described in this specification that the second oxygen sensor 62 is additionally mounted at the exhaust pipe 20. However, instead of additionally mounting the second oxygen sensor 62 at the exhaust pipe 20, the oxygen amount contained in the exhaust gas flowing in the denitrification catalyst 40 may be estimated based on at least one of detected values of the first oxygen sensor 25 and the third oxygen sensor 70, fuel consumption, and engine operating history.

The control portion 50 determines a driving condition of the engine based on signals transmitted from each sensor 25, 35, 36, 55, 60, 62, 65, and 70, and controls additional injection amount and additional injection timing of the fuel based on the driving condition of the engine. Thereby, the control portion 50 controls the denitrification catalyst 40 to release the stored nitrogen oxide. For example, in a case that nitrogen oxide amount stored in the denitrification catalyst 40 is larger than or equal to a predetermined value, the control portion 50 controls the fuel to be additionally injected.

In addition, the control portion 50 controls a ratio of the hydrocarbon to the nitrogen oxide in the exhaust gas to be larger than or equal to a predetermined ratio so as to activate reduction reaction of the nitrogen oxide in the denitrification catalyst 40. The predetermined ratio may be 5.

Meanwhile, the control portion 50 calculates the nitrogen oxide amount stored in the denitrification catalyst 40, slip amount of the nitrogen oxide at a rear portion of the denitrification catalyst 40, and the ratio of the hydrocarbon to the nitrogen oxide based on the driving condition of the engine. Such calculation is done according to a map table defined by various experiments.

In addition, the control portion 50 changes injection pattern of the fuel by the second injector 90 according to the driving condition of the engine, state of the engine, or state of the denitrification catalyst 40. Here, the state of the engine is assumed by considering operating period of the engine, and the state of the denitrification catalyst 40 is assumed by considering degradation of the denitrification catalyst 40.

Further, the control portion 50 performs the regeneration of the particulate filter 30 and the desulfurization of the denitrification catalyst 40. The regeneration of the particulate filter 30 and the desulfurization of the denitrification catalyst 40 will be described in detail.

Meanwhile, the control portion 50 may control the first injector 14 to post-inject the fuel so as to activate the reduction reaction of the nitrogen oxide in the denitrification catalyst 40 instead of additional injection of the second injector 90. In this case, the post-injected fuel is converted into high-reactivity reducing agent at the fuel cracking catalyst 32, and promotes the reduction reaction of the nitrogen oxide in the denitrification catalyst 40. Therefore, it is to be understood that the additional injection includes the post-injection in this specification and claim sets.

Hereinafter, one example of the denitrification catalyst 40 will be described in detail.

The denitrification catalyst 40 includes first and second catalyst layers coated on a carrier. The first catalyst layer is disposed close to the exhaust gas, and the second catalyst layer is disposed close to the carrier.

The first catalyst layer oxidizes the nitrogen oxide contained in the exhaust gas, and reduces a portion of the oxidized nitrogen oxide through oxidation-reduction reaction with the hydrocarbon contained in the unburned fuel or the exhaust gas. In addition, the remaining portion of the oxidized nitrogen oxide is diffused into the second catalyst layer.

The second catalyst layer stores the nitrogen oxide diffused from the first catalyst layer, and releases the stored nitrogen oxide by additionally injected fuel such that the stored nitrogen oxide is reduced at the first catalyst layer.

The second catalyst layer includes an adsorption material. Weak alkaline oxides are used as such an adsorption material. Generally, since nitrogen oxide and oxides of sulfur are oxidation gases, they are well absorbed in an alkaline material. Such an adsorption material absorbs the oxides of sulfur as well as the nitrogen oxide, and the oxides of sulfur absorbed in the adsorption material deteriorates purification performance of the denitrification catalyst 40. Therefore, the desulfurization of the denitrification catalyst 40 is necessary.

Hereinafter, operation of the denitrification catalyst 40 will be described in detail.

In a case that the fuel is not additionally injected from the second injector 90, the nitrogen oxide contained in the exhaust gas is oxidized in the first catalyst layer. A portion of the oxidized nitrogen oxide is reduced into nitrogen gas through the oxidation-reduction reaction with the hydrocarbon contained in the exhaust gas. At this stage, the hydrocarbon contained in the exhaust gas is oxidized into carbon dioxide.

In addition, the remaining portion of the oxidized nitrogen oxide and the nitrogen oxide contained in the exhaust gas are diffused into the second catalyst layer and are stored therein.

In a case that the fuel is additionally injected from the second injector 90, the additionally injected fuel passes through the fuel cracking catalyst, and the fuel is converted into the hydrocarbon of the low molecule at this time. In addition, the portion of the hydrocarbon of the low molecule is converted into the oxygenated hydrocarbon and passes through the denitrification catalyst 40.

At this time, the nitrogen oxide is released from the second catalyst layer through the substituted reaction with the hydrocarbon. In addition, the nitrogen oxide is reduced into the nitrogen gas and the hydrocarbon and the oxygenated hydrocarbon are oxidized into the carbon dioxide in the first catalyst layer through the oxidation-reduction reaction of the released nitrogen oxide with the hydrocarbon and the oxygenated hydrocarbon.

Therefore, the nitrogen oxide and the hydrocarbon contained in the exhaust gas are purified.

Figure 2:
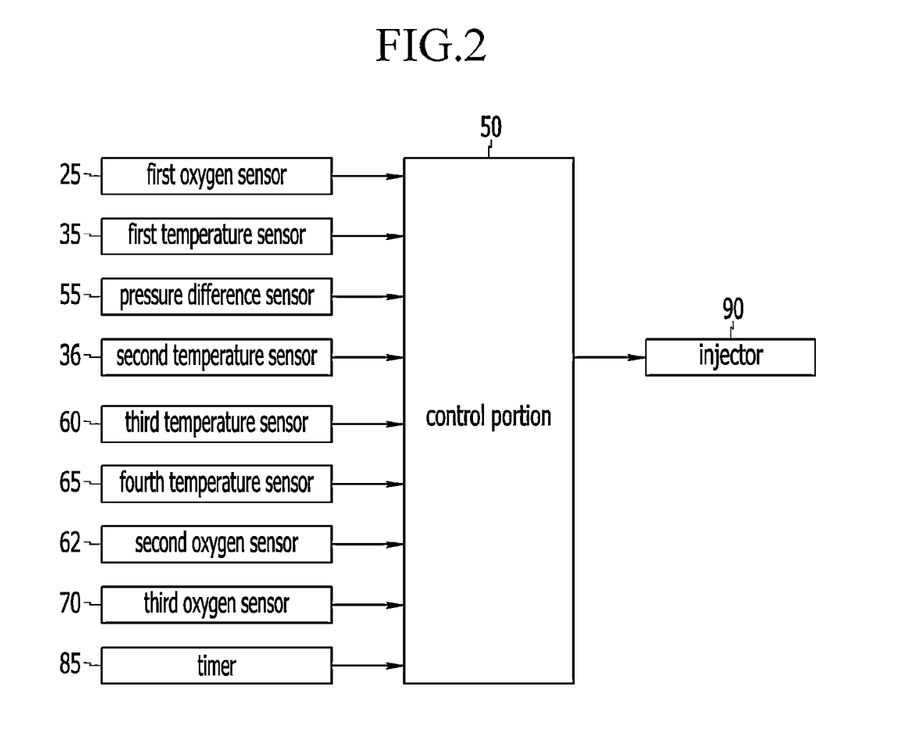
FIG. 2 is a block diagram showing a relationship of an input and output of a control portion used in an exemplary exhaust purification system for an internal combustion engine according to the present invention.

As shown in FIG. 2, detected values by the first, second, and third oxygen sensors 25, 62, and 70, the first, second, third, and fourth temperature sensors 35, 36, 60, and 65, and a timer 85 are transmitted to the control portion 50. The control portion 50 determines the driving condition of the engine, the additional injection amount and the additional injection timing of the fuel, and the additional injection pattern based on the detected values, and outputs a signal for controlling the second injector 90 to the second injector 90. In addition, the control portion 50 controls the regeneration of the particulate filter 30 based on a value detected by the pressure difference sensor 55. As described above, the regeneration of the particulate filter 30 is performed by the post-injection of the first injector 14 or the additional injection of the second injector 90. Further, the control portion 50 determines whether the desulfurization entering condition is satisfied based on values detected by the timer 85 and the pressure difference sensor 55, and estimates a poisoning amount of sulfur based on engine operating time, fuel consumption, and engine oil consumption estimated according to engine operating history.

The timer 85 is turned on when the regeneration of the particulate filter 30 begins, and detects regeneration time of the particulate filter 30. The regeneration time of the particulate filter 30 is transmitted to the control portion 50. On the contrary, the timer 85 is reset when the desulfurization entering condition (referring to FIG. 3) is satisfied in a turned-on state of the timer 85.

In addition, the timer 85 is turned on when the desulfurization of the denitrification catalyst 40 begins, and detects desulfurization time of the denitrification catalyst 40. The desulfurization time is transmitted to the control portion 50. On the contrary, the timer 85 is reset when the desulfurization of the denitrification catalyst 40 is completed in the turned-on sate of the timer 85.

Meanwhile, the exhaust purification system according to various embodiments of the present invention may include a plurality of sensors except the sensors shown in FIG. 2, but description therefore will be omitted for better comprehension and ease of description.

Hereinafter, a desulfurization method for an exhaust purification system according to various embodiments of the present invention will be described in detail.

Figure 3:
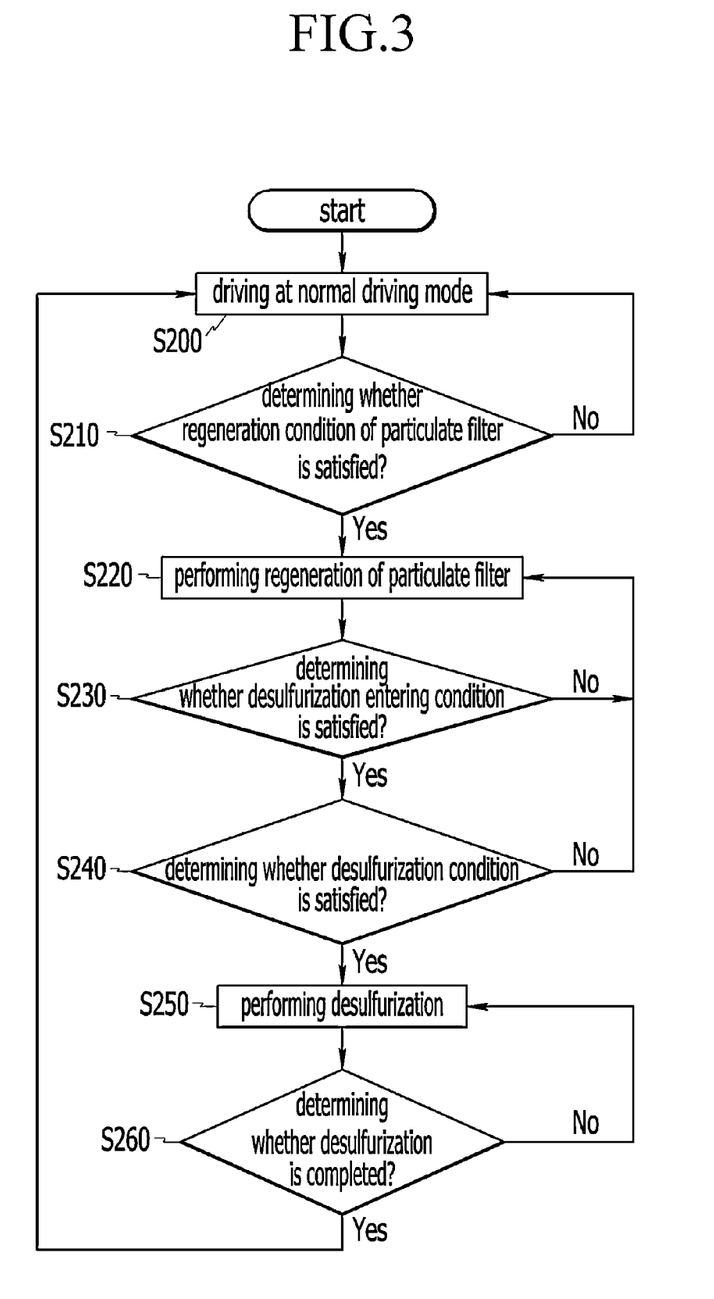
FIG. 3 is a flowchart of an exemplary desulfurization method for an exhaust purification system according to the present invention.

As shown in FIG. 3, in a state that a vehicle drives at a normal driving mode at a step S200, the control portion 50 determines whether the regeneration condition of the particulate filter 30 is satisfied at a step S210. As described above, the regeneration condition of the particulate filter 30 is satisfied when the pressure difference between the inlet and outlet of the particulate filter 30 detected by the pressure difference sensor 55 is higher than or equal to the first predetermined pressure.

If the regeneration condition of the particulate filter 30 is not satisfied at the step S210, the control portion 50 continuously performs the step S200.

If the regeneration condition of the particulate filter 30 is satisfied at the step S210, the control portion 50 performs the regeneration of the particulate filter 30 at a step S220. As described above, the regeneration of the particulate filter 30 is performed by the post-injection of the first injector 14 or the additional injection of the second injector 90. Such a regeneration of the particulate filter 30 proceeds through 2 steps.

Only the regeneration of the particulate filter 30 is performed at the first step. That is, temperature of the exhaust gas rises through the post-injection of the first injector 14 or the additional injection of the second injector 90, and the PM trapped in the particulate filter 30 is burned by the temperature of the exhaust gas. This process requires 5 minutes generally and 75-80% of the PM trapped in the particulate filter 30 is removed.

The regeneration of the particulate filter 30 and the desulfurization of the denitrification catalyst 40 are simultaneously performed at the second step. Since the regeneration of the particulate filter 30 can be done when the temperature of the exhaust gas at the inlet of the particulate filter 30 is higher than or equal to 600° C., the additionally injected fuel is oxidized in the particulate filter 30 by controlling the additional injection of the second injector 90, and the oxidized fuel is gasified before reaching the denitrification catalyst 40 such that air/fuel ratio is rich. Accordingly, the desulfurization of the denitrification catalyst 40 is performed.

In order to perform the second step, the control portion 50 determines whether the desulfurization entering condition is satisfied at a step S230 during the particulate filter 30 is regenerated. The desulfurization entering condition is satisfied, for example, when a predetermined time (e.g., 5 minutes) passes from a regeneration beginning point of the particulate filter 30, when a PM amount in the particulate filter is smaller than a predetermined PM amount (e.g., 20-25% of the PM amount at the regeneration beginning point), or when the pressure difference between the inlet and the outlet of the particulate filter 30 is lower than a second predetermined pressure (that is smaller than the first predetermined pressure). That is, the desulfurization entering condition is used for perceiving an end of the first step.

Meanwhile, the PM amount in the particulate filter can be estimated based on the pressure difference detected by the pressure difference sensor 55.

If the desulfurization entering condition is not satisfied at the step S230, the control portion 50 continues to regenerate the particulate filter 30 at the step S220.

If the desulfurization entering condition is satisfied at the step S230, the control portion 50 determines whether the desulfurization condition is satisfied at a step S240. The desulfurization condition is satisfied when the poisoning amount of sulfur accumulated in the denitrification catalyst 40 is greater than a predetermined poisoning amount. Estimation of the poisoning amount of sulfur accumulated in the denitrification catalyst 40 by a method that a person of an ordinary skill in the art thinks suitable. For example, the poisoning amount of sulfur accumulated in the denitrification catalyst 40 can be estimated based on at least one of the engine operating time, the fuel consumption, and the engine oil consumption estimated according to the engine operating history.

If the desulfurization condition is not satisfied at the step S240, the control portion 50 continues to regenerate the particulate filter 30 at the step S220. On the contrary, if the desulfurization condition is not satisfied at the step S240, the method may be returned to the step S200.

If the desulfurization condition is satisfied at the step S240 step, the control portion 50 performs the desulfurization of the denitrification catalyst 40 at a step S250. That is, the control portion 50 controls operating frequency, operating time, and operating numbers of the second injector 90 according to a predetermined control sequence such that lean atmosphere and rich atmosphere of the air/fuel ratio at the inlet of the denitrification catalyst 40 is repeated. The desulfurization of the denitrification catalyst 40 needs the rich air/fuel ratio, but if the rich air/fuel ratio is maintained long, the denitrification catalyst 40 may be overheated or hydrogen sulfide ($H_2S$) may occur. Therefore, in order to prevent the denitrification catalyst 40 from being overheated and to prevent hydrogen sulfide from occurring, the control portion 50 controls the air/fuel ratio of the denitrification catalyst 40 to repeat the lean atmosphere and the rich atmosphere.

In addition, heat of high temperature generated during the regeneration of the particulate filter 30 is used for desulfurizing the denitrification catalyst 40. For this purpose, the desulfurization of the denitrification catalyst 40 is performed during the regeneration of the particulate filter 30.

After that, the control portion 50 determines whether the desulfurization of the denitrification catalyst 40 is completed at a step S260. That is, if desulfurization time of the denitrification catalyst 40 is longer than or equal to a predetermined time (e.g., 15-30 minutes), the control portion 50 determines that the desulfurization of the denitrification catalyst 40 is completed. In this specification, completion of the desulfurization is determined based on the desulfurization time, but other method for determining completion of the desulfurization may be used. For example, if the poisoning amount of sulfur in the denitrification catalyst 40 is estimated and the estimated poisoning amount of sulfur is smaller than a predetermined amount, it may be determined that the desulfurization is completed.

If the desulfurization of the denitrification catalyst 40 is not completed at the step S260, the control portion 50 continues to perform the desulfurization at the step S250.

If the desulfurization of the denitrification catalyst 40 is completed at the step S260, the desulfurization method for an exhaust purification system according to various embodiments of the present invention returns to the step S200.

Figure 4:
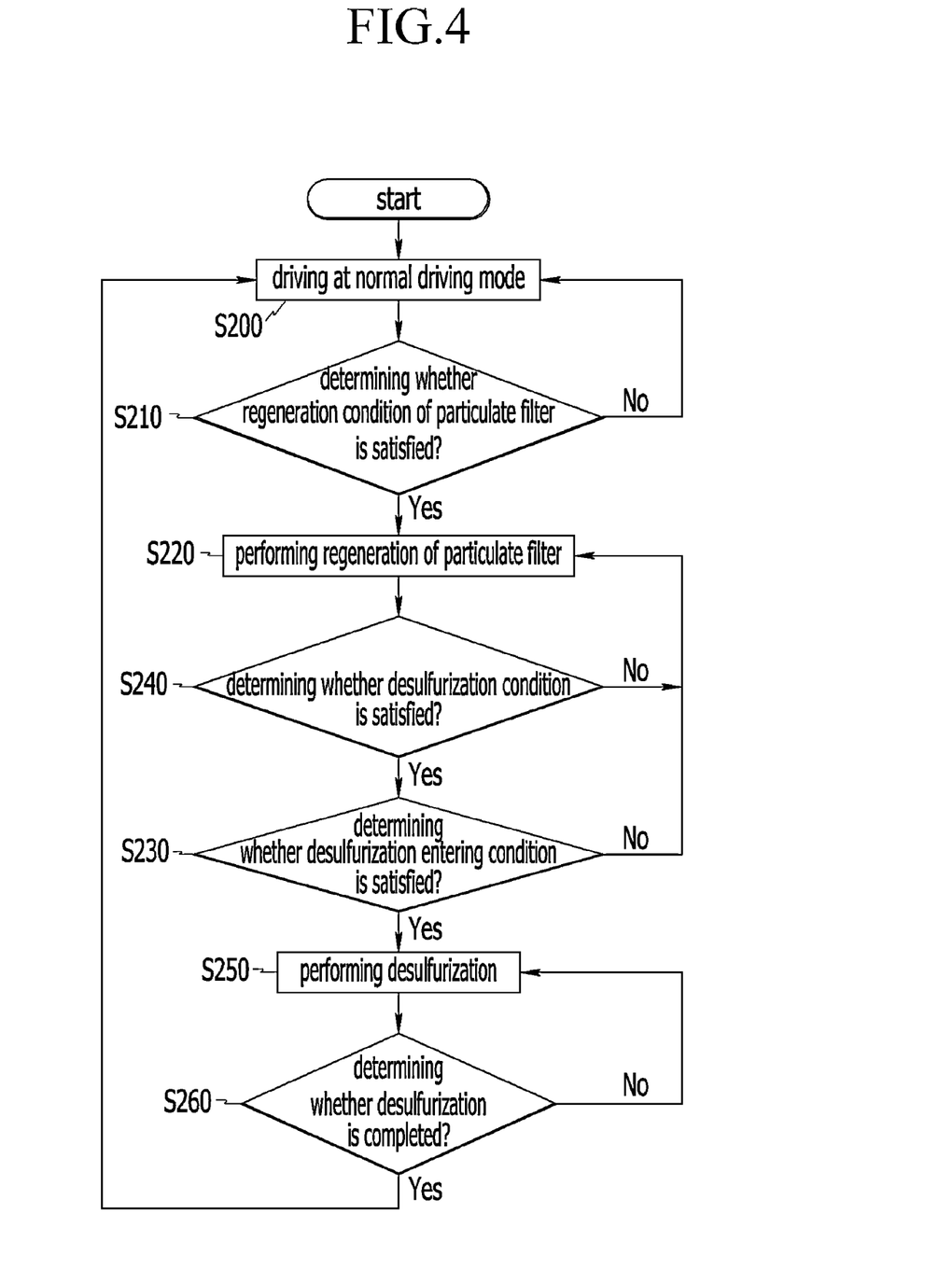
FIG. 4 is a flowchart of another exemplary desulfurization method for an exhaust purification system according to the present invention.

Meanwhile, as shown in FIG. 4, the control portion 50 may determine whether the desulfurization entering condition is satisfied at the step S230 after determining whether the desulfurization condition is satisfied at the step S240 according to another exemplary embodiment of the present invention.

As described above, since regeneration of a particulate filter and desulfurization of a denitrification catalyst are performed simultaneously, a time required for desulfurization may be shortened and fuel economy may be improved according to the present invention.

Since the desulfurization is performed by additionally injecting the fuel by an injector mounted at an exhaust pipe, engine torque may not change and oil dilution may not occur. Therefore, driving performance may be improved.

For convenience in explanation and accurate definition in the appended claims, the terms "upper", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust purification system for an internal combustion engine, comprising:
    an exhaust pipe through which an exhaust gas flows, the exhaust gas being generated at the internal combustion engine having a first injector injecting a fuel to a combustion chamber;
    a second injector mounted at the exhaust pipe and additionally injecting the fuel;
    a particulate filter mounted at the exhaust pipe downstream of the second injector and filtering particulate matters (PM) in the exhaust gas;
    a denitrification catalyst mounted at the exhaust pipe downstream of the particulate filter and reducing nitrogen oxide contained in the exhaust gas; and
    a controller programmed to perform desulfurization of the denitrification catalyst by injecting the fuel through the second injector mounted between the engine and the particulate filter, when a desulfurization entering condition and a desulfurization condition are satisfied during regenerating the particulate filter;
    wherein the controller is programmed to begin regeneration of the particulate filter by injecting the fuel through the second injector when a pressure difference between a front end and a rear end of the particulate filter is higher than or equal to a first predetermined pressure; and
    wherein the desulfurization entering condition is satisfied when a predetermined time passes from a regeneration beginning point of the particulate filter, when a PM amount in the particulate filter is smaller than a predetermined PM amount, or when the pressure difference between the front end and the rear end of the particulate filter is lower than a second predetermined pressure.

2. The exhaust purification system of claim 1, wherein the desulfurization condition is satisfied when a poisoning amount of sulfur accumulated in the denitrification catalyst is greater than a predetermined poisoning amount.

3. The exhaust purification system of claim 2, wherein the poisoning amount of sulfur accumulated in the denitrification catalyst is estimated based on at least one of engine operating time, fuel consumption, and engine oil consumption estimated according to engine operating history.

4. The exhaust purification system of claim 1, wherein the desulfurization of the denitrification catalyst is performed by additionally injecting the fuel by the second injector and by repeating lean atmosphere and rich atmosphere of air/fuel ratio.

5. The exhaust purification system of claim 4, wherein the desulfurization of the denitrification catalyst is performed at hot environment caused by heat generated during the regeneration of the particulate filter.

6. The exhaust purification system of claim 1, further comprising a fuel cracking catalyst disposed at the exhaust pipe between the second injector and the denitrification catalyst, wherein the fuel cracking catalyst promotes evaporation of additionally injected liquid fuel or converts the additionally injected fuel into a high-reactivity reducing agent through thermal decomposition.

7. The exhaust purification system of claim 6, wherein the denitrification catalyst absorbs the nitrogen oxide contained in the exhaust gas, releases the absorbed nitrogen oxide by the additionally injected fuel, and reduces the nitrogen oxide through oxidation-reduction reaction with the high-reactivity reducing agent.

8. A desulfurization method for an exhaust purification system, wherein the exhaust purification system comprises an injector mounted at an exhaust pipe and additionally injecting a fuel, a particulate filter mounted at the exhaust pipe downstream of the injector and filtering particulate matters in the exhaust gas, and a denitrification catalyst mounted at the exhaust pipe downstream of the particulate filter and reducing nitrogen oxide contained in the exhaust gas, the desulfurization method comprising:
    determining whether a regeneration condition of the particulate filter is satisfied;
    performing, in a case that the regeneration condition of the particulate filter is satisfied, the regeneration of the particulate filter by injecting the fuel through the injector mounted between an engine and the particulate filter;
    determining whether a desulfurization entering condition and a desulfurization condition are satisfied during regenerating the particulate filter; and
    performing, in a case that the desulfurization condition and the desulfurization condition are satisfied, desulfurization of the denitrification catalyst by injecting the fuel through the injector;
    wherein the desulfurization entering condition is satisfied when a predetermined time passes from a regeneration beginning point of the particulate filter, when a PM amount in the particulate filter is smaller than a predetermined PM amount, or when the pressure difference between the front end and the rear end of the particulate filter is lower than a second predetermined pressure.

9. The desulfurization method of claim 8, wherein the regeneration condition of the particulate filter is satisfied when a pressure difference between a front end and a rear end of the particulate filter is higher than or equal to a first predetermined pressure.

10. The desulfurization method of claim 8, wherein the desulfurization of the denitrification catalyst is performed by additionally injecting the fuel by the injector and by repeating lean atmosphere and rich atmosphere of air/fuel ratio.

11. The desulfurization method of claim 8, wherein determining whether the desulfurization condition is satisfied is performed when the desulfurization entering condition is satisfied.

12. The desulfurization method of claim 8, wherein determining whether the desulfurization entering condition is satisfied is performed when the desulfurization condition is satisfied.

13. The desulfurization method of claim 8, wherein the desulfurization condition is satisfied when a poisoning amount of sulfur accumulated in the denitrification catalyst is greater than a predetermined poisoning amount.

14. The desulfurization method of claim 13, wherein the poisoning amount of sulfur accumulated in the denitrification catalyst is estimated based on at least one of engine operating time, fuel consumption, and engine oil consumption estimated according to engine operating history.

* * * * *